April 1, 1958  H. FISCHER  2,828,727
FUEL INJECTION PUMP
Filed March 5, 1953  5 Sheets-Sheet 2

INVENTOR.
HANS FISCHER
BY
ATTORNEY

April 1, 1958 H. FISCHER 2,828,727
FUEL INJECTION PUMP
Filed March 5, 1953 5 Sheets-Sheet 3

Fig. 3

INVENTOR.
HANS FISCHER
BY
ATTORNEY

April 1, 1958 H. FISCHER 2,828,727
FUEL INJECTION PUMP
Filed March 5, 1953 5 Sheets-Sheet 4

INVENTOR.
Hans Fischer
BY
ATTORNEY

April 1, 1958 H. FISCHER 2,828,727
FUEL INJECTION PUMP
Filed March 5, 1953 5 Sheets-Sheet 5

INVENTOR.
HANS FISCHER
BY
ATTORNEY

United States Patent Office 2,828,727
Patented Apr. 1, 1958

2,828,727

FUEL INJECTION PUMP

Hans Fischer, South Milwaukee, Wis., assignor, by mesne assignments, to American Bosch Arma Corporation, Springfield, Mass., a corporation of New York Application March 5, 1953, Serial No. 340,578

4 Claims. (Cl. 123—140)

The present invention relates to a fuel injection pump of the solid injection type, for internal combustion engines, such as diesel engines, and the primary object of the present invention is to provide a pump composed of fewer parts than pumps heretofore developed, the individual parts of the pump being of relatively simple design and being comparatively cheap and easy to manufacture.

A further object of the present invention is to provide a fuel injection pump having improved means for co-ordinating the timing and duration of the injection of the fuel as well as means for insuring the injection into the proper cylinder of the engine in accordance with the firing order thereof.

A still further object of the present invention is to provide a fuel pump having a rotor provided with a main fuel passageway and means for facilitating the admission and discharge of fuel to and from the main fuel passageway, a plunger bore opening into said main fuel passageway and a plunger slidably received in the bore and adapted to be moved in a suction-delivery cycle, said rotor having formed therein a by-pass passageway and means for sealing the by-pass passageway during a portion of the delivery stroke of the plunger and for unsealing said by-pass passageway when a predetermined amount of fuel has been expelled from the bore into said main fuel passageway.

Another object of the present invention is to provide in a fuel injection pump, means for sharply reducing the pressure of the fuel in the main fuel passageway of the pump after the proper amount of fuel has been injected through the nozzle into the proper cylinder of the engine, and means for maintaining the residual pressure of the fuel in the fuel line leading from the pump to this cylinder of the engine at a pressure only slightly less than the pressure necessary to open the fuel nozzle.

Other objects and advantages pertaining to details of construction and operation and economy of fabrication and assembly will appear to those skilled in the art after a perusal of the following description taken in conjunction with the accompanying drawings, which drawings and description are to be understood to be illustrative merely, and not to restrict the invention in any manner beyond the requirements of the prior art, and claims.

Fig. 12 is a fragmentary horizontal section taken on the line 12—12 of Fig. 4, with parts removed, showing the fuel pump venting system.

Figure 1:
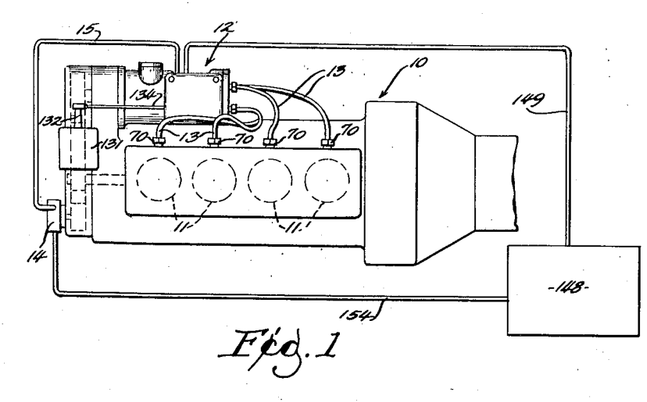
Fig. 1 is a diagrammatic plan view of an internal combustion engine of the diesel type shown in combination with a solid fuel injection pump representative of the present invention.

Referring to Fig. 1 of the drawings, there is shown an internal combustion engine generally designated as 10 having cylinders 11 connected to a fuel injection pump, broadly designated as 12, by means of suitable fuel lines 13. A transfer pump 14 is suitably carried by the engine 10 and is driven therefrom for delivering fuel by way of a fuel line 15 to the injection pump 12 as will be more fully appreciated hereinafter. The transfer pump 14 can be of any suitable or well known construction, such as a gear pump, and it can be driven in any suitable manner from the crank shaft or cam shaft of the engine. The transfer pump 14 is particularly of the type adaptable to engines of the diesel type for delivering fuel to the injection pump of the engine, and a further detailed study of this pump is not considered necessary since the pump will be referred to only in a general way and only in so far as an understanding of the function and operation of the injection pump will deem it necessary.

Figure 3:
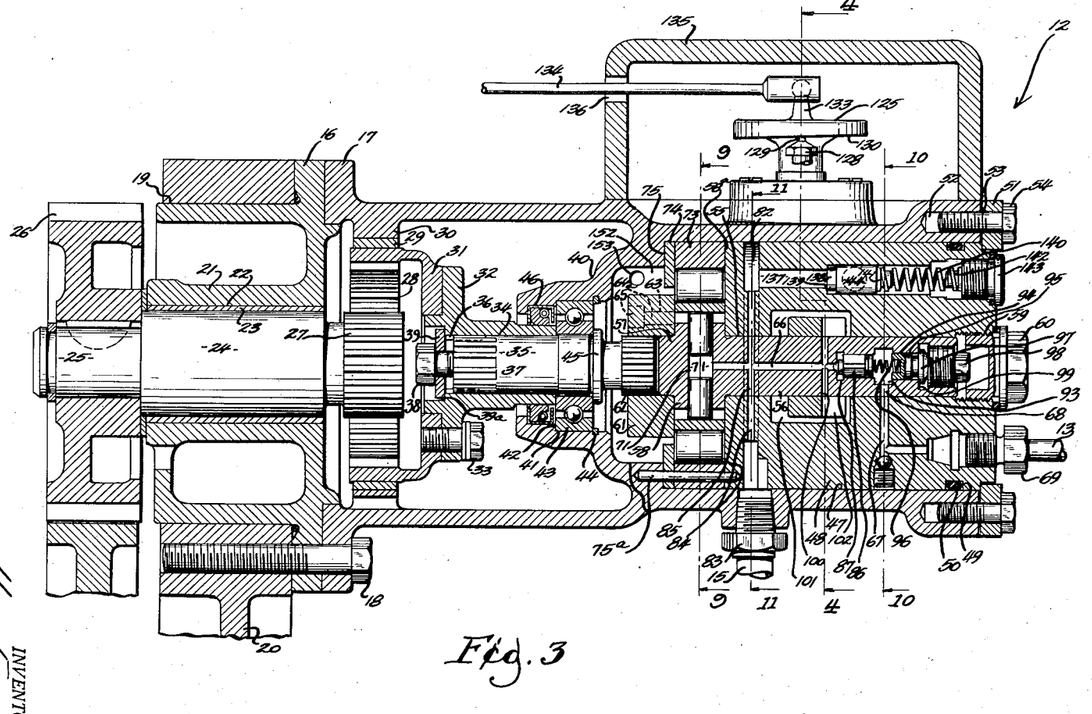
Fig. 3 is a vertical axial sectional view of the structure shown in Fig. 2, with parts removed.

The injection pump 12 is enclosed in a pair of housings 16 and 17 which are secured end to end by means of suitable bolts 18, see Fig. 3. The circumferential surface of the housing 16 is so formed as to be received in an opening 19 formed in a supporting bracket 20, and suitable circumferentially spaced openings are formed therein for threadedly receiving the bolts 18 so that the housings 16 and 17 can be drawn rigidly against the bracket 20, the bracket 20 being formed as a part of the engine 10 and extending laterally therefrom. The housing 16 is formed with a suitable hub portion 21 which has a suitable bore 22 formed therein and in the present instance a bushing 23 is press fitted into the bore 22. A driving shaft 24 is rotatably received in the bushing 23 and is provided adjacent its forward end with a spindle portion 25 which has keyed or otherwise fixed thereon a suitable driving gear 26. The opposite end of the driving shaft 24 extends rearwardly into the housing 17 and has formed adjacent the end thereof a suitable pinion gear 27. An internal ring gear 28 is rotatably supported in a suitable bushing 29 supported in a ring flange 30 formed in the housing 17, the driving shaft 24 being sufficiently off-set with respect to the axis of the ring gear 28 to position the pinion 27 in intermeshing relationship with respect to the teeth of the internal ring gear 28. The driving shaft 24 is driven by any suitable means from the crank shaft of the engine, preferably in the present instance at crank shaft speed and the relationship between the pinion 27 and the internal ring gear 28 is such that the speed imparted to the internal ring gear 28 from the driving shaft 24 in the present embodiment is one-half the speed of the crank shaft of the engine although it is contemplated that certain of the advantages of the invention could be realized even though other ratios should be required under some circumstances.

The ring gear 28 is provided with a converging circumferential flange portion 31 which is so machined as to receive a driving coupling 32. The coupling 32 is drivingly connected to the portion 31 by means of circumferentially spaced machine screws or the like 33, and a suitable bore 34 is formed in the coupling 32 for receiving therein a secondary driving shaft 35. The bore 34 is provided with a splined portion 36 and the secondary drive shaft 35 is also suitably splined as at 37 so as to be drivingly received by the splined portion 36. The secondary drive shaft 35 is axially positioned in the bore 34 by means of a machine screw 38 which is axially threaded into the end of the drive shaft 35 and which bears against a washer 39 received by the machine screw 38 and positioned in abutting relationship with a seat 39a formed on the coupling 32. An internal flange 40 is formed as part of the housing 17 and is provided with a suitable seat 41 and shoulder 42 for supporting the outer race of an anti-friction bearing 43. The outer race of the bearing 43 is held against axial movement with respect to the seat 41 by means of a lock ring 44 which is seated in a suitable groove formed in the seat 41. The inner race of the bearing 43 is adapted to rotatably support the secondary drive shaft 35 and a suitable shoulder 45 is formed on the shaft 35 to confine the inner race with respect to axial movement between the shoulder 45 and the rearward end of the coupling 32. A suitable oil seal 46 is positioned on the coupling 32 adjacent the bearing 43 for well known purposes as will be more fully appreciated hereinafter.

Rearwardly the housing 17 has a carefully machined bore 47 formed therein, and a hydraulic head 48, which has a carefully machined circumferential surface, is received in the bore 47. A circumferential groove 49 is formed adjacent the rearward end of the head 48 and an O-ring 50, of any well known construction and preferably formed of rubber, is received in the groove 49 and compressed against the circumferential surface of the bore 47 so as to prevent seepage of oil rearwardly past the O-ring. A lock ring 51 is positioned in abutting relationship with the rearward end of the housing 17 and the hydraulic head 48, and circumferentially spaced threaded apertures 52 are formed in the housing 17 and positioned to be brought into alignment with suitable apertures 53 formed in the ring 51. Suitable machine screws 54 are threaded into the apertures 52 so as to hold the hydraulic head 48 in its proper position in the bore 47 as will appear more fully hereinafter. The hydraulic head 48 has an axial bore 55 formed therein and a rotor 56 is rotatably received in the bore 55. The rotor 56 has a butt portion 57 formed adjacent the forward end thereof which is positioned in abutting relationship with respect to the rearward end of the secondary drive shaft 35. A radial head portion 58 is formed on the rotor 56 adjacent the butt portion 57 and the rearward surface 58a thereof is positioned in sliding relationship with respect to the forward end of the hydraulic head 48. The axial bore 55 extends the entire length of the head 48 and is formed adjacent the rearward end thereof with a threaded portion 59 which receives therein a screw plug 60. The circumferential surface of the rotor 56 and the circumferential surface of the bore 55 are carefully machined and lapped so as to provide a very close fit between these respective surfaces. The rotor 56 is drivingly connected to the secondary drive shaft 35 by means of a coupler 61. The coupler 61 is drivingly received on a splined end portion 62 of the drive shaft 35 and receives the butt portion 57 sufficiently to position coupler 61 in coaxial relationship with respect to the end of the rotor 56. Suitable aligned openings 63 and 64, are formed in the coupler 61 and in the head portion 58, see Fig. 9, and suitable dowel pins 64a are received therein so that the rotor 56 is drivingly connected to the secondary drive shaft 35. To prevent the displacement of the dowel pins 64a out of the aligned openings 63 and 64 respectively, suitable set screws 65 are threaded into the coupler 61 so as to abut the ends of the respective dowel pins 64a.

Figure 10:
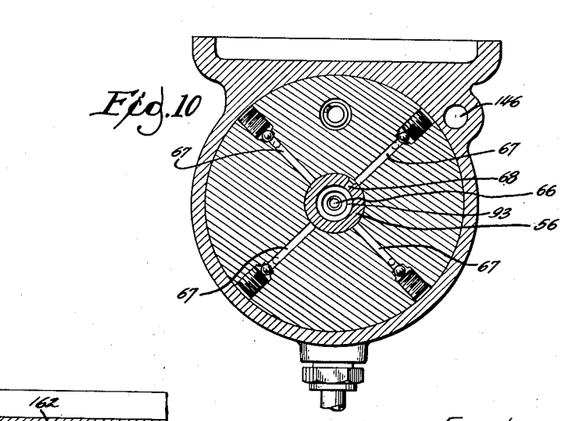
Fig. 10 is a cross-sectional view taken on the line 10—10 of Fig. 3, with parts removed.

A longitudinally and axially extending duct or main fuel passageway 66 is formed in the rotor 56 and the main fuel passageway 66 communicates successively at spaced intervals with a series of outlet passageways 67 formed in the hydraulic head 48. More specifically the outlet passageways 67, as best seen in Fig. 10, are formed in a single plane in the hydraulic head 48 and a discharge passageway 68 extends radially in the rotor 56 from the main fuel passageway 66 in the plane of the outlet passageways 67 so that upon rotation of the rotor 56, the discharge passageway 68 will be brought into successive alignment or registry with respect to the outlet passageways 67. In the present instance the preferred embodiment of the fuel pump is shown and described in reference to its adaptation to an internal combustion engine of four cylinders, although, it will be clear that an engine of any desirable number of cylinders may be utilized with a pump of this construction as will be more fully appreciated hereinafter. The number of cylinders of the engine, however, will determine the number of outlet passageways formed in the hydraulic head, one outlet passageway being preferably utilized for each cylinder of the engine. The outlet passageways 67 communicate with the fuel lines 13 by means of suitable couplings 69, see also Fig. 2, which are threaded into the hydraulic head 48, the fuel lines 13 leading into fuel nozzles 70 of any suitable or well known construction which in turn are positioned to discharge into the respective cylinders 11 of the engine as previously suggested, and as well known in the art.

Figure 9:
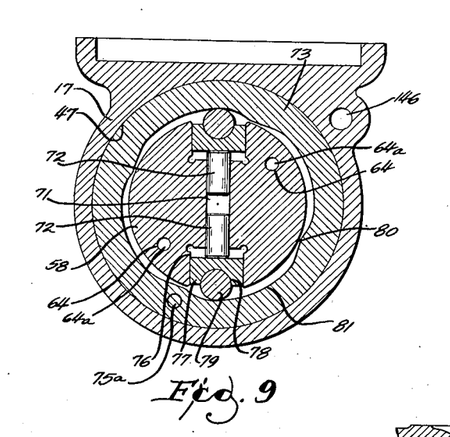
Fig. 9 is a cross sectional view taken on the line 9—9 of Fig. 3, showing the plunger actuating mechanism in greater detail.

The radial head portion 58 of the rotor 56 is formed with a cylindrical or plunger bore 71 which communicates with the main fuel passageway 66 and which in the present instance is formed transverse with respect thereto, see also Fig. 9. The cylindrical bore 71 is carefully machined and lapped and opposed plungers 72 are slidably received in the cylindrical bore 71 and caused to reciprocate therein to periodically cause a discharge of fuel from the main fuel passageway 66 into whichever outlet passageway 67 happens to be in registry with the outlet passageway 68. The reciprocation of the plungers 72 is timed in accordance with the rotation of the rotor 56 and in the present instance the plungers 72 are moved in a suction-delivery cycle in accordance with the rotation of the rotor 56 by means of an internal cam 73 which is received in the cylindrical bore 47 of the housing 17 adjacent the forward end of the hydraulic head 48. A suitable washer 74, Fig. 3, is positioned in abutting relationship with respect to the forward surface of the internal cam 73 and is in turn in abutting relationship with respect to a face 75 formed on the flange 40 of the housing 17, the internal cam 73 being held snugly between the washer 74 and the hydraulic head 48 by means of the force exerted by the machine screws 54 tending to move the hydraulic head 48 forwardly into the housing 17, turning of the hydraulic head, cam 73 and washer 74 within housing 17 being positively prevented by a dowel 75a. The head portion 58 of the rotor 56 is formed with carefully machined guide ways 76, Fig. 9, which communicate with the opposite ends of the cylindrical bore 71, and suitable roller guides or cross heads 77 are slidably received in the respective guide ways 76. The roller guides 77 are each provided with a suitable saddle portion or surface 78 for rotatably supporting therein a roller 79, the respective rollers 79 being permitted rotational movement in the respective saddles 78 about an axis substantially parallel with the axis of the rotor 56 which being secured against displacement out of the respective saddles by means of the hydraulic head 48, the washer 74 and coupling 61. The cam 73 is nonrotatable with respect to the rotor 56 and is formed in the present instance with four opposed cam lobes 80, Fig. 9, and four opposed cam dwells 81, so that upon rotation of the rotor 50, the cam lobes 80 and dwells 81 in conjunction with the centrifugal and other force acting on the respective plungers 72 upon rotation of the rotor 56, will effect a reciprocating movement of the plungers 72 in unison in a suction-delivery cycle in accordance with the rotation of the rotor 56 as will be more fully appreciated hereinafter.

Figure 11:
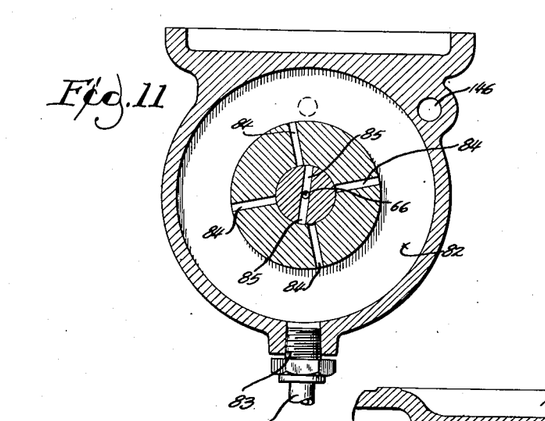
Fig. 11 is a cross-sectional view taken on the line 11—11 of Fig. 3, with parts removed.

A fuel intake reservoir, preferably in the form of a circumferential groove 82, is formed in the hydraulic head 48 and is connected to the fuel transfer pump 14 by means of the fuel line 15 and a coupling 83 threaded into the housing 17. Four equally spaced radially extending inlet passageways 84, see also Fig. 11, are formed in the hydraulic head 48 in the plane of the groove 82, and opposed radially extending inlet passageways 85 are formed in the rotor 56 and lead from the main fuel passageway 66 to the outer periphery. The inlet passageways 85 are co-planar with respect to the inlet passageways 84 so that upon rotation of the rotor 56 the inlet passageways 85 will come into registry with opposed inlet passageways 84 at successively spaced intervals. These inlet passageways 84 and 85 repectively are so formed and positioned as to come into registry when the plungers 72 are moving away from each other or in a suction direction as will be more fully appreciated hereinafter. The fuel transfer pump 14 delivers fuel into the reservoir 82 at a pressure of 30 to 50 pounds per square inch, and this fuel, when the inlet passageways 85 are in registry with a pair of opposed inlet passageways 84, is forced into the main fuel passageway 66 and into the cylindrical bore 71 in the space formed between the opposed plungers 72, the pressure of the fuel being delivered into the cylindrical bore 71 being sufficient to urge or aid in moving the plungers 72 in their suction direction to the extent allowed by the cam 73 along with the centrifugal force imposed thereupon when the rotor is rotated. Upon further rotation of the rotor 56, the inlet passageways 85 are moved out of alignment or registry with this pair of opposed inlet passageways 84 and the inlet passageways 84 are consequently sealed by the circumferential surface of the rotor 56, the plungers 72 being then moved in a delivery direction by means of the internal cam 73.

A desirable feature of an injection nozzle is its ability to cut off sharply at a predetermined point the flow of fuel into a cylinder of an engine. To facilitate this it is desirable in a fuel injection pump to provide means for sharply reducing the pressure in the main fuel passageway after the proper amount of fuel has been injected out of the nozzle, thus preventing the nozzle from dripping any fuel into the cylinder after the intended injection has taken place. It is further desirable in a system of this type to maintain the residual pressure in the fuel line leading from the pump to the nozzle at a pressure only slightly less than the pressure necessary to open the fuel nozzle, this, as will be explained more fully hereinafter, permitting the fuel in the main fuel passageway to be easily built up again to a pressure greater than the pressure necessary to actuate the fuel nozzle for the next injection besides preventing any pressure waves or surging from occurring within the fuel lines as would occur if the residual pressure was greatly reduced with respect to the necessary operating pressure in the main fuel passageway.

For maintaining the residual pressure in the fuel lines 13 at a pressure only slightly less than the necessary injection pressure, a retracting valve 86, of any well known or suitable construction is slidably received in a piston chamber 87 and is adapted to be moved into and out of sealing relationship with respect to the main fuel passageway 66. The piston chamber 87 leads or opens into an enlarged bore 93 into which the outlet passageway 68 communicates. The bore 93 in turn leads or opens into a bore 94 which is substantially the same diameter as the chamber 87. A retainer 95 is axially positioned in the bore 94 and a spring 96 is compressed between the retracting valve 86 and the retainer 95 for urging the retracting valve in a seating direction with respect to the main fuel passageway 66. The retainer 95 is provided with a head portion 97 and a suitable plug 98 is threaded into the end of the rotor 56 sufficiently to press the retainer 95 against a shoulder 99 formed adjacent the rearward end of the bore 94. The operation of the retracting valve for maintaining the residual pressure in the fuel lines 13 at a pressure only slightly less than the necessary injection pressure, is thought to be well known in the art and further discussion of this valve in the present instance is not deemed necessary for an understanding of the present invention.

Figures 2, 4, 5:
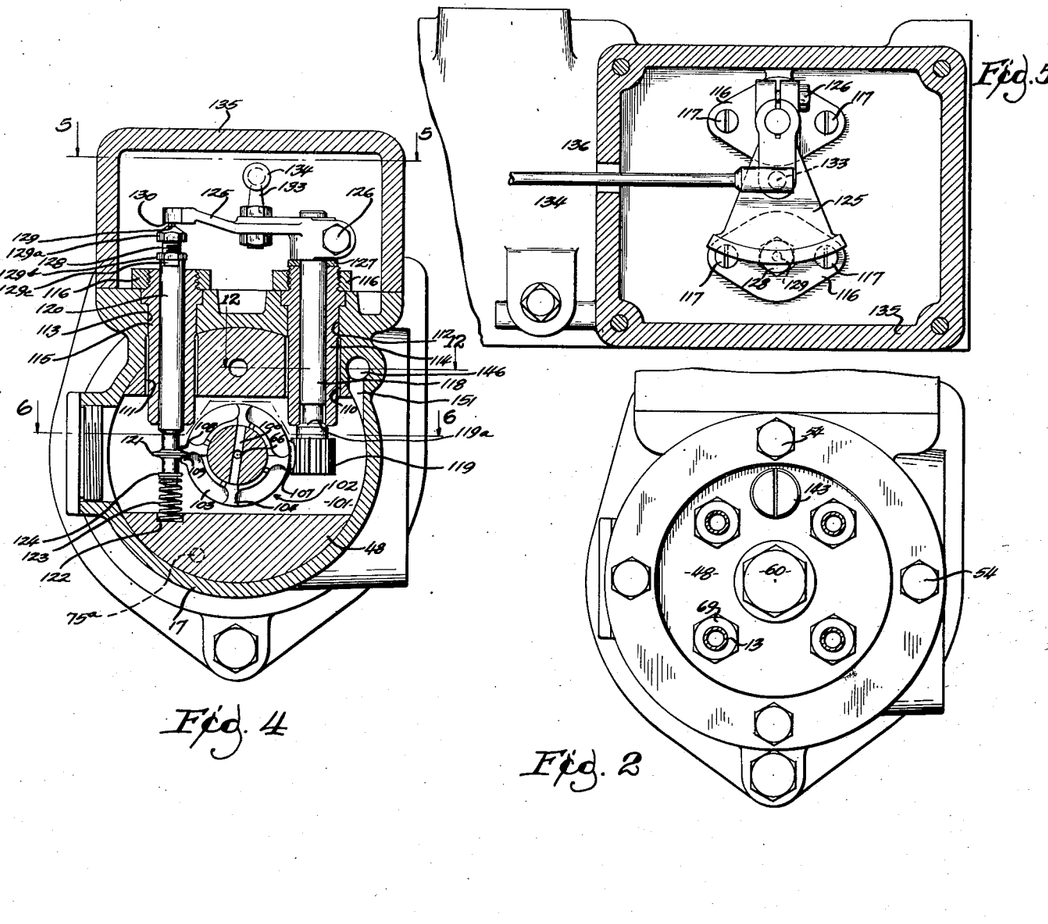
Fig. 2 is a rear end view of the fuel pump embodying the present invention, with parts removed.
Fig. 4 is a cross sectional view taken on the line 4—4 of Fig. 3.
Fig. 5 is a horizontal sectional view of the structure shown in Fig. 4 taken on the line 5—5 thereof, with parts removed.
Figure 6:
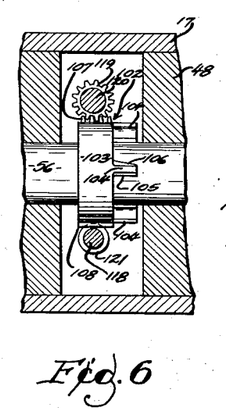
Fig. 6 is a horizontal sectional view of certain structure shown in Fig. 4 taken on the line 6—6 thereof, with parts removed.
Figures 7, 15:
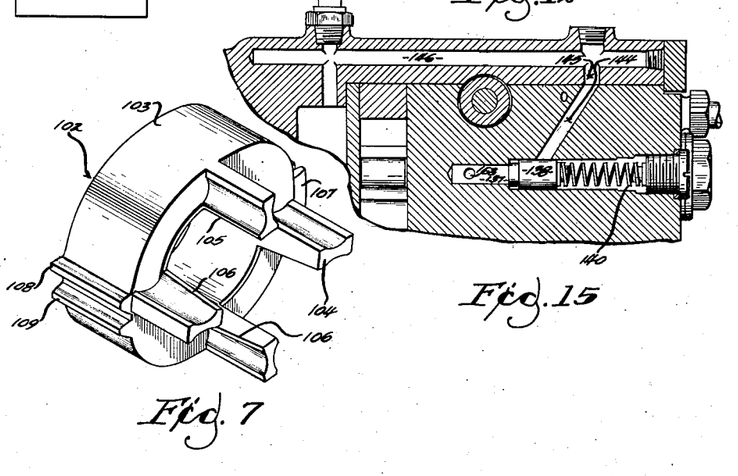
Fig. 7 is a perspective view of the control collar shown in Fig. 6, slightly enlarged.
Fig. 15 is a view similar to Fig. 12 showing the fuel venting system employed by the modified fuel pump shown in Fig. 14.

To suddenly reduce the pressure in the main fuel passageway 66 after the injection of the proper amount of fuel into the proper cylinder of the engine has occurred, opposed radially extending by-pass passageways 100 are formed in the rotor 56 opening into the main fuel passageway 66. A sump 101 in the form of a transverse slot or opening is formed in the hydraulic head 48 and is of a size sufficient to receive the rotor 56 therein with substantial clearance, and the sump is so positioned that the by-pass passageways 100 open or empty into the sump 101. A control collar, designated generally as 102, see also Figs. 4, 6, and 7, is positioned in the sump 101 and comprises in the present instance a ring portion 103 which is rotatably received by the rotor 56 and positioned slightly forwardly of the bypass passageways 100. Axially extending teeth 104 are formed on the ring portion 103 and extend in a direction so as to seal the by-pass passageways 100 at successively spaced intervals upon rotation of the rotor 56. The internal circumferential surface of the ring portion 103 and the internal circumferential surface of the respective teeth 104 which is continuous with that of the ring, is carefully machined and lapped so that there is an extremely close fit between the rotor 56 and the control collar 102. As previously suggested, the fuel injection pump in the present instance is particularly adapted for an engine of 4 cylinders, and the control collar 102 in the present instance is therefore formed with 4 circumferentially and equally spaced teeth 104. However, as previously stated the present pump can be adapted for use with an engine of any desirable number of cylinders and the number of teeth employed on the control collar 104 will be determined by the number of cylinders of the engine with which the fuel pump is to be used. The teeth 104 in the present instance are each formed with a straight or axially extending leading edge 105 and an oblique trailing edge 106, the leading and trailing edges being considered in the light of the direction of rotation of the rotor 56. The control collar 102 is so positioned on the rotor 56 as to seal the by-pass passageways 100 by means of a pair of opposed teeth 104 when the plungers 72 are being moved in a delivery direction or during a portion of a delivery cycle of the plungers, and when the inlet passageways 85 have been moved out of registry with respect to a pair of opposed inlet fuel passageways 84. It will be appreciated therefore that when the inlet passageways 85 are out of registry with a pair of inlet fuel passageways 84, and the by-pass passageways 100 are sealed by a pair of opposed teeth 104, and the retracting valve 86 is in sealing relationship with respect to the main fuel passageway 66, that the fuel in the main fuel passageway 66 is trapped therein and that the pressure thereof is capable of being greatly increased by the compressive force exerted thereupon by the plungers 72.

In operation the fuel, when the rotor 56 is turned sufficiently to bring the inlet passageways 85 into registry with a pair of opposed inlet fuel passageways 84, is urged into the main fuel passageway 66 and into the cylindrical bore 71 between the opposed plungers 72. When the inlet passageways 85 are in registry with the respective inlet fuel passageways 84, the by-pass passageways 100 are in unsealed relationship with respect to a pair of opposed teeth 104, and the plungers 72 are being moved in a suction direction. Upon further rotation of the rotor 56, the respective opposed fuel passageways 84 are sealed by the rotor and the plungers 72 are being urged in a delivery direction, the initial movement of the plungers 72 in a delivery direction flushing a portion of the fuel in the cylindrical bore 71 and in the main fuel passageway 66 through the by-pass passageways 100, the by-pass passageways 100 remaining unsealed momentarily immediately after the fuel inlet passageways 84 are sealed by the rotor 56. Upon continued rotation of the rotor 56, the by-pass passageways 100 are moved into sealing relationship with respect to a pair of opposed teeth 104, and upon further rotation of the rotor 56, the plungers 72 are moved sufficiently in a delivery direction to compress the fuel in the cylindrical bore 71 between the respective plungers 72 and in the main fuel passageway 66 sufficiently to increase the pressure thereof enough to overcome the force exerted against the retracting valve 86 tending to move the retracting valve into sealing relationship with respect to the passageway 66. At the instant that the pressure of the fuel in the main fuel passageway 66 is sufficiently high to move the retracting valve 86 in an unseating direction, the discharge passageway 68 is brought into registry with one of the outlet fuel passageways 67 so that the fuel in the main fuel passageway 66 is delivered to the proper fuel nozzle 70 at a sufficiently high pressure to actuate the fuel nozzle. Further rotation of the rotor 56 moves the by-pass passageways 100 into an unsealed position with respect to the before mentioned pair of opposed teeth 104 and the fuel remaining in the main fuel passageway 66 is immediately released, detoured or "spilled" into the sump 101 by way of the by-pass passageways 100, the pressure of the fuel in the main fuel passageway tending to urge the retracting valve 86 in an unseating direction dissipating substantially instantaneously. Since the usual type of fuel nozzle has as one of its characteristics the ability to cut off sharply the flow of material through the nozzle upon a decrease of the pressure of the fluid flowing into the nozzle, the injection by the fuel nozzle into the cylinder will cease immediately when the by-pass passageways 100 are moved into an unsealed position with respect to the opposed teeth 104, and the residual pressure of the fluid in the respective fuel line 13, outlet passageways 68 and 67, and in the bore 78, along with the force exerted by spring 96, will rapidly urge the retracting valve into seating relationship with respect to the passageway 66 with a substantially instantaneous loss of pressure in passageway 67 only sufficient to cause prompt actuation of the connected nozzle and avoid dribbling of any fuel into the cylinder, while the remainder of the pressure is retained for the next injection in a manner well known in the art. Upon further rotation of the rotor 56, the plungers 72 are once again moved in a suction direction and the fuel inlet passageways 85 are again brought into registry with a pair of opposed inlet fuel passageways 84 and the cycle is again repeated.

The control collar 102 has as one of its characteristics the ability to meter the fuel injected into the respective cylinders of the engine in accordance with the load and speed of the engine as well as means for advancing or retarding the injection into the respective cylinders in accordance with the load and speed of the engine. This is accomplished in the present instance by forming on opposite sides of the ring portion 103 of the control collar 102 a toothed rack 107 and a pair of cooperating gear teeth 108 and 109 respectively. Openings 110 and 111 are formed in the hydraulic head 48 and extend upwardly substantially in the plane of the toothed rack 107 and cooperating gear teeth 108 and 109 respectively, the respective openings 110 and 111 communicating with the sump 101 of the head 48. Aligned openings 112 and 113 are formed in the housing 17 and suitable bearing sleeves 114 and 115 respectively are received in the aligned openings and fixed with respect to axial movement therein by means of suitable lock heads 116 which are threadedly received adjacent the upper end of the respective bearing sleeves 114 and 115 and locked against turning movement with respect thereto by means of suitable machine screws 117 which are threadedly received in suitable apertures formed in the housing 17. Sleeve 114 rotatably receives therein a shaft or stem 118 which extends downwardly beyond the end of the sleeve 114 and into the sump 101. The end of the stem 118 is formed with a suitable gear head or pinion 119 which is positioned in intermeshing relationship with respect to the toothed rack 107 formed on the ring 103 so that when the stem 118 is turned or rotated in either direction, the control collar 102 will be shifted axially on the rotor 56 a distance and in a direction corresponding to the amount of rotation and the direction of rotation imparted to the stem 118. Pinion 119 provides a sealing surface 119a which seats against a mating surface on sleeve 114 to prevent the escape of fuel from sump 101 along stem 118. A timing rod 120 is slidably received in the sleeve 115 and extends downwardly beyond the end of the sleeve 115 into the sump 101. The timing rod 120 has formed adjacent the lower end thereof a circumferential tooth 121 which is positioned to be snugly received between the cooperating teeth 108 and 109 of the ring portion 103. A seat 122 is formed in the hydraulic head 48 in alignment with the timing rod 120 and receives therein a spring 123 which is placed in compression between seat 122 and a seat 124 formed adjacent the lower end of the timing rod 120, the compressive force of spring 123 urging the timing rod 120 upwardly in the sleeve 115. A rocker arm 125 is clamped adjacent the upper end of the stem 118 by means of a suitable bolt or the like 126 and a suitable washer 127 is received by the stem 118 between the upper end of the sleeve 114 and the rocker arm 125. The upper end of the timing rod 120 has threadedly received therein a suitable cap screw 128 which carries adjacent its upper end a spherical bearing or ball 129. Screw 128 is readily adjusted up or down in rod 120 by use of a wrench on a head 129a, the adjustment being maintained by a lock nut 129b. Flat surfaces or the like 129c are provided on timing rod 120 to engage a wrench or suitable tool for holding rod 120 while screw 128 is being adjusted. The rocker arm 125 is substantially wing-shaped and is of a size sufficient to extend over the bearing ball 129 of the timing rod 120. The timing rod 120 is urged upwardly by the compressive force of the spring 123, and this upward movement of the timing rod is limited only by the abutment of the bearing ball 129 against the under surface of the rocker arm 125. This under surface of the rocker arm 125 which is in contact with the ball 129 of the timing rod 120, and which is designated by the number 130, is in the form of a cam surface and this surface is so formed that when the stem 118 is rocked or rotated in the bearing sleeve 114, the timing rod 120 will be moved axially in the sleeve 115 to the extent determined by the shape of the surface 130. A governor of any suitable or well known construction, designated as 131, see Fig. 1, is connected to the engine 10 so as to be preferably driven from the cam shaft thereof as well known in the art. The governor 131 has a laterally extending rock arm 132 and the rock arm 125 is provided with a suitable connecting element 133. The connecting element 133 is connected to the rock arm 132 of the governor by means of a suitable link 134 as will be more fully appreciated hereinafter. Since governors of various types of construction are well known in the art, and since a detailed description of the mechanism of the governor in the present instance is not deemed necessary for a clear understanding of the fuel pump of the present invention, the governor has been shown only diagrammatically.

Figure 8:
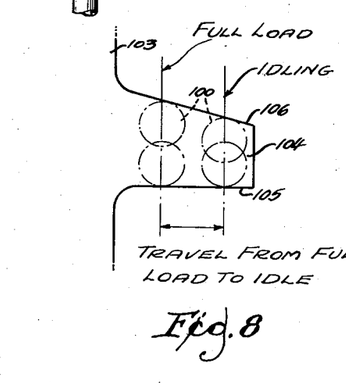
Fig. 8 is an enlarged view, diagrammatic in character, of one of the teeth of the control collar showing it in sealing relationship with respect to the by-pass passageway and its relationship with respect thereto when the control collar has been positioned for full load and for idling.

As previously suggested, the pressure of the fuel in the main fuel passageway 66 is instantly increased when the by-pass passageways 100 are sealed by a pair of opposed teeth 104, and the amount of fuel injected out of the main fuel passageway 66 into the respective cylinders of the engine is controlled by the length of time that the by-pass passageways are sealed by the teeth 104 of the control collar. Since each of the teeth 104 of the control collar 102 is formed with a straight leading edge 105 and an oblique trailing edge 106, the length of time that the by-pass passageways 100 will be in a sealed position with respect to a pair of opposed fingers 104 will be determined by the axial position of the control collar 102 with respect to the by-pass passageways. More specifically, when the control collar 102 is positioned so that the by-pass passageways 100 are substantially adjacent the widest portion of each of a pair of opposed teeth 104, the length of time that the by-pass passageways will be sealed by the respective teeth will be greater than when the control collar is positioned so that the by-pass passageways are sealed by the teeth 104 adjacent the narrowest part thereof, see Fig. 8. Therefore, by axially shifting the control collar on the rotor 56, the fuel pump can be regulated so as to deliver a predetermined maximum amount of fuel per injection or a predetermined minimum amount of fuel per injection, or any amount of fuel per injection between these two extremes. Also, as previously suggested, the control collar is rotatably shiftable with respect to the rotor 56 and is capable of being held in various adjusted positions with respect to the by-pass passageways 100 so as to either advance or retard the injection of fuel from the main fuel passageway 66. More specifically when the control collar 102 is shifted counter-clockwise as viewed in Fig. 4, the direction of the rotor 56 being in a clockwise direction as viewed in this figure, the injection of fuel from the main fuel passageway 66 will be advanced in relation to the cycling of the engine, and when the control collar 102 is shifted in a clockwise direction by means of the timing rod, the injection of fuel from the main fuel passageway 66 will be retarded.

As previously suggested, the stem 118 and the timing rod 120 are interconnected by means of the rock arm 125 which in turn is connected to the rock arm 132 of the governor 131 by means of the link 134, the governor 131 being responsive to the speed of the engine in a manner well known in the art. In operation, a heavy load upon the engine 10 will slow the engine and be reflected in the governor 131 so that the rock arm 132 thereof will push against the link 134 sufficiently to rotate the stem 118 in a counter-clockwise direction, see Fig. 6, sufficiently to move the control collar 102 to the right. When the control collar 102 is moved to the right, the by-pass passageways 100 will be so positioned with respect to the teeth 104 that the wider portions of the teeth 104 will be in sealing relationship with respect to the by-pass passageways 100, and as previously stated the amount of fuel injected into the respective cylinders of the engine will be greater when the wider portions of the teeth 104 are in sealing relationship with the by-pass passageways than when the narrower parts of the teeth 104 are in sealing relationship with respect to the by-pass passageways. Upon rotation of the stem 118 in a counter-clockwise direction, the timing rod 120 will be moved axially downwardly in the bearing sleeve 15 against the force exerted by the spring 123. This axial shifting of the timing rod 120 is occasioned by the cam surface 130 of the rock arm 125 pressing against the bearing ball 129 as previously suggested. Therefore, downward shifting of the timing rod 120 will rotatably shift the control collar 122 in a counter-clockwise direction as viewed in Fig. 4 so as to advance the discharge of fuel from the main fuel passageway 66 in relation to the cycling of the engine sufficiently to insure maximum performance of the engine, it having been noted that, at least in certain types of engines with which the present invention is intended to be used, best performance is obtained when heavy loads are being carried and relatively large quantities of fuel are being injected, by starting the injection earlier in the cycle than when lighter loads are being carried. In other words when the injection is increased in amount it is also advanced in point of time relatively to the engine cycle.

It will be apparent that the disclosed mechanism could, with slight modification be adapted to cause retarding of the start of injection with an increase of quantity, in case it were to be used with an engine which happened to require such characteristics. When the load on the engine is suddenly decreased, the stem 118 will be turned in the opposite direction, the link 134 being pulled forwardly by the rock arm 132 of the governor 131, and the control collar 102 will consequently be axially shifted on the rotor 56 to the left sufficiently to change the period of time the by-pass passageways 100 are sealed by the teeth 104. Upon rotation of the stem 118 in the opposite direction, the relationship between the cam surface 130 of the rock arm 125 and the bearing ball 129 is changed so that the timing rod 120 is permitted to be shifted upwardly in response to the compressive force of the spring 123, this upward shifting of the timing rod rotatably shifting the control collar 102 in the opposite direction so as to retard the injection of fuel from the main fuel passageway in accordance with the amount of fuel being injected into the respective cylinders and in accordance with the load and speed of the engine. It will be appreciated therefore that the control collar 102 is rotatably shiftable on the rotor 56 in accordance with the axial position of the control collar with respect to the by-pass passageways 100 and that the axial position of control collar 102 is governed by the load and speed of the engine by means of the connecting link 134. It is to be noted that the adjustment of screw 128 into or out of rod 120 without movement of arm 125 will cause rotation of collar 102 and consequent advancing or retarding of the injection of the fuel. This feature makes possible a ready and accurate initial adjustment of the timing of the pump. Ordinary care in manufacture of the parts and proper assembly thereof will result roughly in correct timing of the pump to the engine, that is, with the injection commencing around top dead center on the compression stroke. Owing to slight variations in manufacture, however, and accumulation of tolerances etc., this may not be accurate enough for maximum efficiency of the engine. By adjusting screw 128 in response to proper tests, it is readily possible to obtain the maximum performance of which the engine is capable. Likewise correction is easily possible at any time if conditions change for any reason.

A protective cover 135 is suitably fastened to the housing 17 for enclosing the rocker arm 125 and its associated mechanisms, and an opening 136 is formed in the cover 135 for receiving therein link 134.

Referring again to Fig. 3, a relief port 137 is formed in the hydraulic head 48 and communicates with the circumferential groove 82, and a relief valve 138 is slidably positioned in the port 137 and adapted to be moved in sealing relationship with respect to a seat 139. A coiled spring 140 is compressed between a seat 141 formed on the relief valve 138 and a seat 142 formed on the end of a plug 143 threadedly received into the end of the port 137, the compressive force of the spring 140 urging the relief valve into seating relationship with respect to the valve seat 139. The spring 140 is so proportioned as to maintain the relief valve 138 in seating relationship with respect to the valve seat 139 when the fuel in the circumferential groove 82 is under a normal operating pressure, this pressure in most instances ranging from 30 to 50 pounds per square inch as previously suggested. When the pressure of the fuel in the circumferential groove 82 becomes excessive, the relief valve 138 will be urged in an unseating direction against the force exerted by the spring 140 and a sufficient amount of the fuel in the groove 82 will be by-passed through the port 137 into a return port 144 to reduce the pressure of the fuel in the groove 82 to its normal operating pressure, the spring 140 urging the relief valve 138 in a sealing direction when the pressure of the fuel in the groove 82 reaches its normal operating pressure.

Referring to Fig. 12 of the drawings, the return port 144 extends laterally in the head 48 and is in open communication with an opening 145 formed in the housing 17. A longitudinally extending port 146 is formed in the housing 17 and is plugged adjacent the rearward end thereof by means of a suitable threaded plug 147. The opening 145 is in open communication with the port 146 and the port 146 is connected to a fuel tank or reservoir 148 by means of a suitable conduit 149, see also Fig. 5, coupling 150 threaded into the housing 17. The fuel by-passed past the relief valve 138 is therefore returned to the fuel tank 148 by way of the return port 144, the opening 145, the port 146, the coupling 150 and the conduit 149.

A downwardly extending port 151, see also Fig. 4, is formed in the housing 17 and interconnects the sump 101 with the port 146 so that the fuel by-passed into the sump 101 can be returned to the fuel tank 148 by way of the coupling 150 and the conduit 149.

The chamber formed in the housing 17 and defined by the flange 40, the oil seal 46, the coupling 61, the washer 75, and the rotor 56, and which is designated by the number 152, is provided with suitable venting means for returning any fuel oil which accumulates therein to the fuel tank 148. This venting means comprises a laterally extending return port 153 formed in the housing 17 and interconnecting the chamber 152 and the port 146, the port 146 being interconnected with the fuel tank 148 as previously mentioned by means of the coupling 150 and conduit 149 so that any fuel which might seep into the chamber 152 will be returned to the fuel tank 148.

The fuel tank 148 is interconnected with the fuel transfer pump 14 for well known purposes by means of a conduit 154 of any suitable or well known construction.

Figure 13:
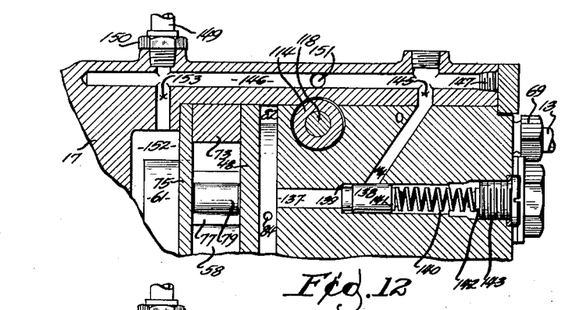
Fig. 13 is a fragmentary vertical axial sectional view showing a fuel pump having a modified means for successively admitting fuel into the main fuel passageway of the pump.

Fig. 13 shows a modification of the means for admitting fuel into the main fuel passageway 66 and into the cylindrical bore 71 in the space formed between the opposed plungers 72 at timed intervals with respect to the rotation of the rotor 56 and during the suction stroke of the plungers. In this modification, a circumferential groove or fuel reservoir 155 is formed in the hydraulic head 48 adjacent the forward end thereof. An annular fuel reservoir 156, which is formed as an enlargement of the bore 55 of the head 48 adjacent the forward end thereof and which is substantially coaxial with the rotor 56, is interconnected with the reservoir 155 by a plurality of substantially radially extending passageways 157. A pair of opposed radially extending fuel passageways 158 are formed in the rotor 56, and each of these passageways 158 is interconnected with the cylindrical bore 71 by means of a connecting passageway or port 159, the connecting passageways 159 being equally spaced on opposite sides of the main fuel passageway 66. The openings of the connecting passageways 159 into the cylindrical bore 71 are so positioned as to be in an unsealed position with respect to the respective plungers 72 when the plungers 72 have been moved in a suction direction a predetermined distance and to be sealed by the plungers 72 when the respective plungers have been moved in a delivery direction a predetermined distance. Fuel is delivered into the reservoir 155 by means of the transfer pump 14, the fuel line 15, and a coupling such as previously described coupling 83, and the fuel in the reservoir 155 is urged into the annular reservoir 156 by way of the connecting passageways 157. As previously suggested with reference to the first described embodiment of the present invention, the fuel is delivered into the reservoir 155 and consequently into the reservoir 156 under a pressure ranging from 30 to 50 pounds per square inch. The openings of the connecting passageways 159 into the bore 71 are so positioned that they will be in an unsealed position with respect to the respective plungers 72 during movement of the plunger 72 in a suction direction and when the by-pass passageways 100 are in an unsealed position with respect to a pair of opposed fingers 104 of the collar 102. Therefore at this instant there is momentary free communication between chamber 156, where there is a pressure of 30 to 50 pounds per square inch and sump 101 where there is substantially atmospheric pressure, by way of ports 159, bore 71, main fuel passageway 66 and by-pass passageways 100. A momentary flow of fuel then occurs, tending to flush out and clear away any bubbles of gas or other undesirable substances which may tend to form or accumulate in these parts. Upon further rotation of the rotor 56, the plungers 72 will be caused to be moved in a delivery direction and will accordingly flush an additional portion of the fuel admitted into the bore 71 between the respective plungers 72 and in the main fuel passageway 66 out through the by-pass passageways 100 and into the sump 101. Continued rotation of the rotor 56 will move the respective plungers 72 in unison in a delivery direction sufficiently to seal the opening of the connecting passageways 159 into the bore 71 thereby preventing the admission of any more fuel into the bore 71. After the connecting passageways 159 have been sealed by the respective plungers 72, the by-pass passageways 100 are moved into a sealed position with respect to a pair of opposed teeth 104 of the control collar 102 and the pressure of the fuel in the bore 71 and in the main fuel passageway 66 is increased very rapidly upon continued rotation of the rotor 56, the retracting valve 86 being moved in an unseating direction with respect to the main fuel passageway 66 when the pressure of the fuel reaches a predetermined amount in a manner as previously described. After the injection of the proper amount of fuel into the proper cylinder of the engine, the by-pass passageways 100 are moved into an unsealed position with respect to the fingers 104 of the control collar and the plungers 72 are caused to move in a suction direction. Upon sufficient rotation of the rotor 56 to move the plungers 72 sufficiently in a suction direction to unseal the openings of the connecting passageways 159 into the cylindrical bore 71, fuel is again admitted into the bore 71 and into the main fuel passageway 66, and the cycle is then repeated upon continued rotation of the rotor. To aid in moving the plungers 72 in unison in a suction direction, a coiled spring 160 is positioned in the cylindrical bore between the respective plungers 72 so that the expansive force of the spring urges the plungers in a suction direction in unison.

Figure 14:
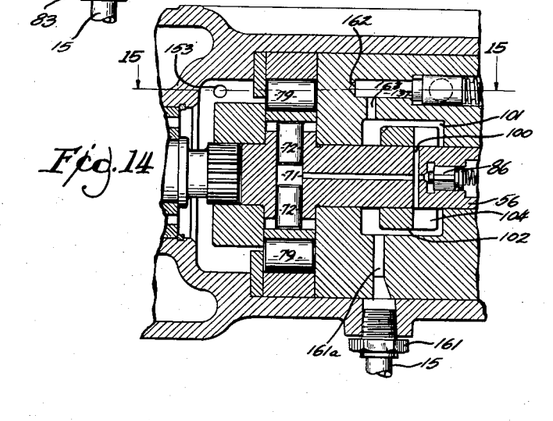
Fig. 14 is a fragmentary vertical axial sectional view of a fuel pump having another modified means for successively admitting fuel into the main fuel passageway of the pump.

Figs. 14 and 15 represent a further modification of means for admitting the fuel into the main fuel passageway 66 and into the cylindrical bore 71 during the suction cycle of the plunger 72. It will be appreciated that the by-pass passageways 100 are in unsealed relationship with respect to a pair of opposed teeth 104 of the control collar 102 when the plungers are being moved in a suction direction and that the relationship between the teeth 104 and the by-pass passageways 100 is such that the by-pass passageways 100 are sealed for a predetermined length of time by the teeth 104 during the delivery cycle of the plungers. The present modification contemplates therefore the use of the sump 101 as the fuel intake reservoir as well as its use as the reservoir for the by-passed fuel after the injection has taken place. The fuel transfer pump 14 is connected to the sump 101 by means of the fuel line 15, a suitable connecting coupling 161 which is threadedly received in a suitable aperture formed in the housing 17 and in the head 48, and a connecting part 161a interconnecting the sump 101 with the coupling 161. As previously suggested the fuel transfer pump delivers fuel to the fuel reservoir formed in the hydraulic head 48, in this instance the reservoir being the sump 101, under a pressure ranging from 30 to 50 pounds per square inch. The relief port 137 in the present instance is formed with a dead-end 162, and a passageway 163 is formed in the head 48 which interconnects the sump 101 with the relief port 137. The longitudinally extending return port 146, which is formed in housing 17 as previously described, is interconnected with the port 137 by return port 144 and opening 145, and the sump 101 is interconnected with the return port 144 upon the relief valve 138, in response to the pressure of the fuel in the sump 101, being moved sufficiently in an unseating direction against the force exerted by the spring 140. In operation, the fuel transfer pump 14 preferably delivers a sufficient volume of fuel into the sump 101 to keep the sump full at all times and under a pressure of 30 to 50 pounds, and to maintain the relief valve 138 in an unsealed position with respect to the return port 144 so that the fuel in the sump is at all times being flushed through the passageway 163, into the relief port 137, and into the return port 146 by way of the port 144, the return port 146 being connected to the fuel tank 148 by means of the conduit 149 and coupling 150 as previously described.

In the operation of the pump embodying this modification the by-pass passageways 100 are in unsealed relationship with respect to the teeth 104 of the control collar when the plungers are being moved in a suction direction as clearly explained hereinbefore. The fuel is therefore urged by the aforementioned 30 to 50 pounds pressure into the main fuel passageway 66 and into the cylindrical bore 71 between the respective plungers 72 from the sump 101 and assists or is instrumental in moving the plungers in unison in a suction direction. Upon continued rotation of the rotor 56, the plungers 72 are urged in a delivery direction, and the initial movement of the plungers 72 in a delivery direction flushes a portion of the fuel in the bore 71 between the respective plungers 72 and in the main fuel passageway 66 back into the sump 101 by way of the by-pass passageways 100, the by-pass passageways 100 at this time still being in an unsealed position with respect to the teeth 104 of the control collar. Further rotation of the rotor 56 moves the by-pass passageways 100 into a sealed position with respect to a pair of opposed fingers 104 of the control collar locking thereby the fuel in the main fuel passageway 66 and in the cylindrical bore 71 against exit therefrom. Still further rotation of the rotor 56 moves the plungers 72 in unison in a delivery direction sufficiently to compress the fuel in the bore 71 and in the main fuel passageway 66 sufficiently to increase the pressure thereof enough to move the retracting valve 86 in an unseating direction in a manner as previously described with respect to the previously illustrated embodiments. After the proper amount of fuel is injected into the proper cylinder of the engine and upon further rotation of the rotor 56, the by-pass passageways 100 are again moved into an unsealed position with respect to the teeth 104 of the control collar, and the fuel in the main fuel passageway 66 and in the bore 71, which is under an extremely high pressure, is urged into the sump 101 by way of the by-pass passageways 100, the pressure of the fuel in the bore 71 and in the passageway 66 being immediately equalized with that of the fuel in the sump 101. As mentioned with respect to the previously described embodiments, the check valve 86 is immediately moved sufficiently in a seating direction to seat against the passageway 66 when the passageways 100 move into an unsealed position with respect to fingers 104. When the pressure of the fuel in the by-pass passageway 61 is equalized by the pressure of the fuel in the sump 101, and upon the rotor's being rotated sufficiently to urge the plunger in a suction direction, the fuel in the sump 101 is again urged into the main fuel passageway 66 and into the bore 71 between the respective plungers 72, and the cycle is again repeated. Any fuel by-passed into the sump from the bore 71 and the passageway 66 after the injection has taken place is flushed along with more fuel in sump 101 into the return port 146, upon the relief valve's being in an unseating position with respect to port 144, through which it is returned to fuel tank 148 in a manner as previously described.

Figure 16:
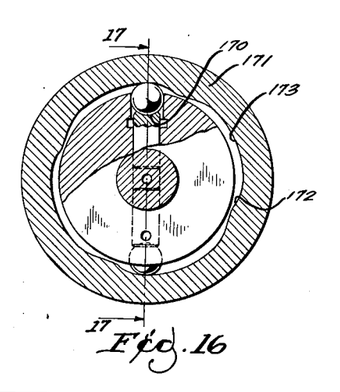
Fig. 16 is a view similar to Fig. 9, with parts removed, showing a modification of the plunger actuating mechanism.
Figure 17:
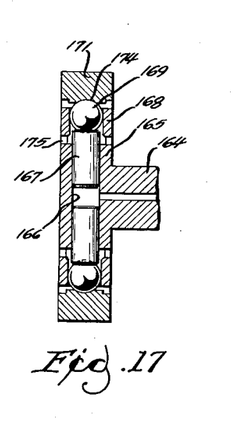
Fig. 17 is a cross-sectional view taken on the line 17—17 of Fig. 16, with parts removed.

Figs. 16 and 17 illustrate a modified means for effecting reciprocating movement to the plungers in unison in accordance with the rotation of the rotor. In this modification a rotor 164 is provided with a radial head portion 165, rotor 164 and head portion 165 being substantially similar in construction to rotor 56 and head portion 58 of the previously described embodiments, rotor 165 being provided with a suitable bore 166 for slidably receiving therein a pair of suitable plungers 167. The head portion 165 is provided with a pair of opposed radially extending bores 168 which are positioned substantially coaxial with respect to the plunger bore 166 and each of which are formed so as to snugly receive therein a suitable bearing ball 169. The outer end of each of the plungers 166 is formed with a suitable dished-out seat 170 which substantially conforms with the outer circumference of its respective bearing ball 169 so as to receive the ball therein. An internal cam ring 171 having clam lobes 172 and dwells 173 and substantially similar to previously described internal cam ring 73 is provided for effecting reciprocating movement of the plungers 167 in unison upon rotation of the rotor 164. The internal cam ring 173 is provided with a suitable ball receiving track 174 so that upon rotation of the rotor 164 the respective balls 169 will be free to roll against the track 174 and the seats 170 of their respective plungers 169. Suitable openings 175 are axially formed in the head 165 and open into the bore 168 for venting the bore of any fuel which might accumulate therein. It will be appreciated that this construction in operation is substantially similar to the construction of the previously described embodiment. However, this construction incorporates certain economies in manufacture and for this reason may prove more satisfactory from a commercial standpoint.

Some changes may be made in the arrangement, construction, and combination of the various parts of the improved device, without departing from the spirit of the invention, and it is the intention to cover by the claims, such changes as may reasonably be included within the scope thereof.

The invention claimed is:

1. In a fuel injection pump for use with an internal combustion engine, a hydraulic head having fuel inlet and outlet passageways, a rotor mounted in said head and having a main fuel passageway adapted to connect at intervals with the respective inlet and outlet passageways of said hydraulic head, said rotor having formed therein a cylindrical bore opening into said main fuel passageway, a plunger slidably received in said cylindrical bore and adapted to be moved in a suction-discharge cycle in accordance with rotation of the rotor, said hydraulic head having formed therein a sump, and said rotor having formed therein a by-pass leading from said main fuel passageway into said sump, a control collar positioned in said sump and received by said rotor, said control collar having formed thereon a plurality of circumferentially-spaced axially-extending converging teeth which are positioned in intimate contact with said rotor and which are positioned to successively seal said by-pass during a portion of the discharge cycles of the plunger and to unseal the by-pass when a predetermined amount of fuel has been injected into the respective outlet passageways formed in the hydraulic head, means responsive to the speed of the engine for axially shifting the control collar with respect to the rotor for increasing or decreasing the time interval during which said by-pass is sealed by said converging fingers for regulating the amount of fuel injected by said pump in accordance with the load and speed of the engine, and means responsive to the speed of the engine for holding said control collar against rotation with respect to said hydraulic head in various adjusted positions with respect to said by-pass for advancing or retarding the injection of fuel into said outlet passageways in accordance with the load and speed of the engine.

2. For use with an internal combustion engine having a governor, a fuel injection pump of the type described including a hydraulic head having fuel inlet and outlet passageways, a rotor mounted in said head and having a main fuel passageway adapted to connect at intervals with the respective inlet and outlet passageways of said hydraulic head to enable the admission and discharge of fuel to and from the main fuel passageway of said rotor, said rotor having formed therein a bore opening into said main fuel passageway, a plunger slidably received in said bore and adapted to be moved in suction-discharge cycles in accordance with rotation of the rotor, said hydraulic head having formed therein a sump and said rotor having formed therein a by-pass leading from said main fuel passageway into said sump, a control collar positioned in said sump and received by said rotor, said control collar having formed thereon a plurality of axially-extending circumferentially-spaced converging fingers which are positioned in intimate contact with said rotor and which are adapted to successively seal said by-pass during a portion of the discharge cycles of the plunger and to unseal the by-pass when a predetermined amount of fuel has been injected into the respective outlet passageways formed in the hydraulic head, said control collar having formed on opposite sides thereof a toothed rack and a pair of cooperating gear teeth, a rotatable stem rotatably carried in said hydraulic head in the plane of said toothed rack and extending into the sump, said stem having formed adjacent the lower end thereof a gear head which is positioned in intermeshing relationship with respect to said toothed rack for axially shifting the control collar on the rotor in response to rotation of the stem, a timing rod slidably secured in said head in the plane of said cooperating gear teeth and having formed adjacent the lower end thereof a tooth which is positioned to be received between said cooperating teeth, means interconnected between the stem and the timing rod for axially shifting the timing rod in accordance with rotational movement being imparted to the stem for rotatably shifting the control collar in accordance with the axial movement imparted to the control collar, and a link connecting the last mentioned means to said governor for automatically regulating the pump in accordance with the load and speed of the engine.

3. For use with an internal combustion engine having a governor, a fuel injection pump including a hydraulic head having fuel inlet and outlet passageways, a rotor mounted in said head and having a main fuel passageway adapted to connect at successive intervals with the respective inlet and outlet passageways to enable the admission and discharge of fuel to and from the main fuel passageway of the rotor, said rotor having formed therein a bore opening into said main fuel passageway, a plunger slidably received in said bore and adapted to be moved in suction-discharge cycles in accordance with the rotation of the rotor, said hydraulic head having formed therein a sump and said rotor having formed therein a by-pass leading from said main fuel passageway into said sump, a control collar positioned in said sump and received by said rotor, said control collar having formed thereon a plurality of axially extending circumferentially spaced teeth which are positioned in intimate contact with the circumference of said rotor and which are positioned to successively seal said by-pass during a portion of the discharge cycles of the plunger and to unseal said by-pass when a predetermined amount of fuel has been injected into the respective outlet passageway in registry with the main fuel passageway, said teeth being formed with leading edges substantially parallel with the axis of said rotor and trailing edges oblique with respect to the axis of said rotor, said control collar having formed on opposite sides thereof respectively a toothed rack and a pair of cooperating gear teeth, a rotatable stem carried in said hydraulic head in the plane of said toothed rack and extending into said sump, said stem having formed adjacent the lower end thereof a gear head which is positioned in intermeshing relationship with respect to said toothed rack for axially shifting the control collar on the rotor in response to rotation of the stem, a timing rod slidably secured in said head in the plane of said cooperating teeth and having formed adjacent the lower end thereof a tooth which is positioned to be received between said cooperating teeth formed on said control collar for rotatably shifting the control collar on the rotor in accordance with axial movement of the timing rod, a rocker arm secured adjacent the upper end of said stem and being of a size sufficient to extend over said timing rod, the under surface of said rocker arm being in the form of a cam surface for axially shifting the timing rod in accordance with the rotational movement imparted to the stem for rotatably shifting the control collar on the rotor in accordance with axial shifting of the control collar on the rotor, means for urging the timing rod into abutting relationship with respect to the cam surface formed on the rocker arm, and means connecting said rocker arm to said goverenor for automatically regulating the injection and timing of the fuel by the fuel pump in accordance with the load and speed of the engine.

4. For use with an internal combustion engine having a governor, a fuel injection pump including a hydraulic head having fuel inlet and outlet passageways, a rotor mounted in said head and having a main fuel passageway adapted to connect at successive intervals with the respective inlet and outlet passageways to enable the admission and discharge of fuel to and from the main fuel passageway of the rotor, said rotor having formed therein a bore opening into said main fuel passageway, a plunger slidably received in said bore and adapted to be moved in suction-delivery cycles in accordance with the rotation of the rotor, said hydraulic head having formed therein a sump and said rotor having formed therein a by-pass leading from said main fuel passage into said sump, a control collar positioned in said sump and received by said rotor, said control collar having formed thereon a plurality of axially extending circumferentially spaced converging fingers which are positioned in intimate contact with the circumference of said rotor and which are positioned to successively seal said by-pass during a portion of each delivery cycle of the plunger and to unseal said by-pass when a predetermined amount of fuel has been injected into the respective outlet passageway in registry with the main fuel passageway, said control collar having formed on opposite sides thereof a toothed rack and a pair of cooperating gear teeth, a rotatable stem carried in said hydraulic head in the plane of said toothed rack and extending into said sump, said stem having formed adjacent the lower end thereof a gear head which is positioned in intermeshing relationship with respect to said toothed rack for axilly shifting the control collar on the rotor in response to rotation of the stem, a timing rod slidably secured in said head in the plane of said cooperating teeth and having formed adjacent the lower end thereof a tooth which is positioned to be received between said cooperating teeth formed on said control collar, a rocker arm secured adjacent the upper end of said stem and being of a size sufficient to extend over said timing rod, the under surface of said rocker arm being in frictional contact with said timing rod and being in the form of a cam surface for axially shifting the timing rod in accordance with the rotational movement imparted to the stem for rotationally shifting the control collar in accordance with axial shifting of the control collar, means for urging the timing rod into abutting relationship with respect to the cam surface formed on the rocker arm, and a link connecting said rocker arm to said governor for automatically regulating the injection and timing of fuel by the pump in accordance with the load and speed of the engine.

References Cited in the file of this patent

UNITED STATES PATENTS

| | | |
|---|---|---|
| 2,156,933 | Alden | May 2, 1939 |
| 2,413,115 | Sheehan | Dec. 24, 1946 |
| 2,622,577 | Retel | Dec. 23, 1952 |
| 2,624,327 | Hogeman | Jan. 6, 1953 |
| 2,641,238 | Roosa | June 9, 1953 |
| 2,674,236 | Humber | Apr. 6, 1954 |
| 2,683,445 | Seaver | July 13, 1954 |